United States Patent [19]
Brooks et al.

[11] Patent Number: 5,754,673
[45] Date of Patent: May 19, 1998

[54] DOCUMENT IMAGE PROCESSING SYSTEM INCLUDING A FIRST DOCUMENT PATH FOR THE AUTOMATED PROCESSING OF DOCUMENTS AND A SECOND DOCUMENT PATH FOR THE PROCESSING OF DOCUMENTS REQUIRING OPERATOR CORRECTION

[75] Inventors: Ralf M. Brooks; John Otto Vieth, both of Waterloo, Canada

[73] Assignee: NCR Corporation, Dayton, Ohio

[21] Appl. No.: 491,645

[22] Filed: Jun. 19, 1995

[51] Int. Cl.[6] .................................................. G06K 9/00
[52] U.S. Cl. ....................... 382/112; 235/462; 382/137
[58] Field of Search ................................ 382/112, 137, 382/138, 139; 209/539

[56] References Cited

U.S. PATENT DOCUMENTS

| | | | |
|---|---|---|---|
| 4,167,729 | 9/1979 | Christenson et al. | 340/146.3 |
| 4,231,014 | 10/1980 | Ponzio | 340/146.3 |
| 4,431,322 | 2/1984 | Nally et al. | 400/605 |
| 4,523,330 | 6/1985 | Cain | 382/7 |
| 4,555,617 | 11/1985 | Brooks et al. | 235/379 |
| 4,685,141 | 8/1987 | Hoque et al. | 382/138 |
| 4,731,524 | 3/1988 | Brooks | 235/432 |
| 4,947,321 | 8/1990 | Spence et al. | 364/401 |
| 5,040,226 | 8/1991 | Elischer et al. | 382/7 |
| 5,073,953 | 12/1991 | Westdijk | 382/9 |
| 5,097,517 | 3/1992 | Holt | 382/137 |
| 5,307,423 | 4/1994 | Gupta et al. | 382/182 |
| 5,457,524 | 10/1995 | Metcalf et al. | 355/309 |
| 5,488,671 | 1/1996 | Kern | 382/138 |
| 5,542,547 | 8/1996 | Ricciardi | 209/539 |

*Primary Examiner*—Joseph Mancuso
*Assistant Examiner*—Jayanti K. Patel
*Attorney, Agent, or Firm*—James M. Stover

[57] ABSTRACT

An image based, dual path, document processing system including an imaging unit, a character recognition unit, a dual path module and an encoder. A document received by the system is sequentially processed through the imaging unit, the character recognition unit, the dual path module and the encoder. The imaging unit images the front face of the document and attempts to identify character data appearing on the face of said document, such as a hand-written courtesy amount appearing on a bank check, while the character recognition unit is utilized to reads machine-readable data, such as MICR data, printed on the face of the document. The dual path module includes a first document path for directly delivering the document through the dual path module to the encoder upon successful processing of the document by the imaging and character recognition units, and a second document path including an action window wherein an operator may perform corrective action on the document upon unsuccessful processing of the document by either the imaging unit or the character recognition unit.

11 Claims, 10 Drawing Sheets

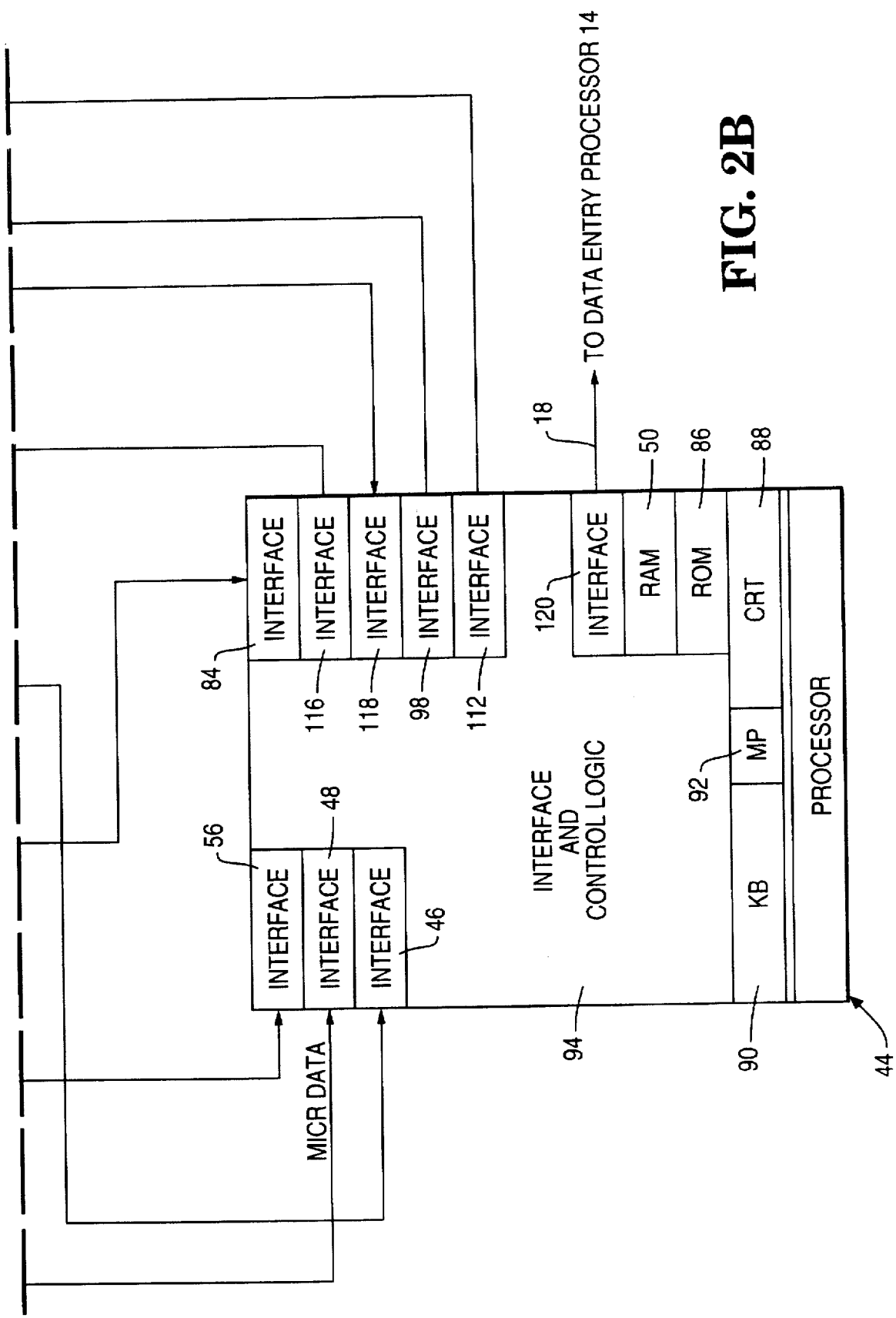

DOCUMENT IMAGE PROCESSING SYSTEM INCLUDING A FIRST DOCUMENT PATH FOR THE AUTOMATED PROCESSING OF DOCUMENTS AND A SECOND DOCUMENT PATH FOR THE PROCESSING OF DOCUMENTS REQUIRING OPERATOR CORRECTION

The present invention relates to a banking method and system for processing documents and, more particularly, to a document processing system including image recognition and a dual track structure which provides single document pass operation, eliminating the requirement of duplicate processing of illegible or misread documents.

BACKGROUND OF THE INVENTION

Bank documents such as checks, for example, have certain data such as individual account numbers, bank routing numbers etc., printed thereon in magnetic ink, for example, and this data is commonly referred to as magnetic ink character recognition or MICR data. When a document is received at a bank for processing, the monetary amount of the document is written, for example, by a customer in plain or non-magnetic ink. Part of the routine processing of a document such as a check requires that the monetary amount of the check be printed thereon in magnetic ink, thereby making it part of the MICR data on the check to be used for subsequent mechanical processing.

The process of recording the monetary amount of the check in MICR data on the check is normally performed automatically. Often, checks being processed are accompanied by related account statements or bills which include account and payment amount information which can be utilized to determine the monetary amount of the check. Documents which are correctly machine-read pass through the processing system. However, if they're not fully processed automatically, then the entire machine is stopped down until an operator processes those aspects of the documents that need working on and then those documents are passed through. Alternatively, the documents which are not correctly read may be diverted to a sorting pocket at the end of the machine. An operator would thereafter correct and process the rejected documents as a separate pass.

Present state-of-the-art recognition performance typically results in a 50% correct read rate, therefore half of the documents being processed automatically would require operator intervention to complete, with accompanying disruptions in the machine processing of succeeding documents and the necessity of additional passes of corrected documents through the system to complete processing.

OBJECTS OF THE INVENTION

It is therefore an object of the present invention to provide a new and useful automated document processing system which eliminates disruptions in document processing resulting from a failure in the automated processing of a document.

It is another object of the present invention to provide a new and useful automated document processing system which eliminates the necessity of re-processing documents following a failure in the automated processing of a document.

It is yet another object of the present invention to provide such a processing system which includes a dual path processing module, allowing machine readable documents to be automatically processed and directing illegible documents to an operator for correction and re-entry into the system.

SUMMARY OF THE INVENTION

There is provided, in accordance with the present invention, an image based, dual path, document processing system including an imaging unit, a character recognition unit, a dual path module and an encoder. A document received by the system is sequentially processed through the imaging unit, the character recognition unit, the dual path module and the encoder. The imaging unit images the front face of the document and attempts to identify character data appearing on the face of said document, such as a handwritten courtesy amount appearing on a bank check, while the character recognition unit is utilized to reads machine-readable data, such as MICR data, printed on the face of the document. The dual path module includes a first document path for directly delivering the document through the dual path module to the encoder upon successful processing of the document by the imaging and character recognition units, and a second document path including an action window wherein an operator may perform corrective action on the document following unsuccessful processing of the document by either the imaging and character recognition units.

In the described embodiment, the character recognition unit employs both magnetic ink character recognition (MICR) and optical character recognition (OCR) readers to read machine-readable information printed on the document. Additionally the system described herein may include buffering devices between system elements, an endorse unit following the encoder for printing application specific character data or bar coding on the document, or an image capture/storage unit following the encoder for providing an image authentication and identification function for said document The above and other objects, features, and advantages of the present invention will become apparent from the following description and the attached drawings.

BRIEF DESCRIPTION OF THE DRAWINGS

FIGS. 2A and 2B, taken together, form a schematic diagram, in block form, showing in greater detail the image processing system shown in FIG. 1.

DETAILED DESCRIPTION OF THE PREFERRED EMBODIMENT

System Overview

Figure 1:
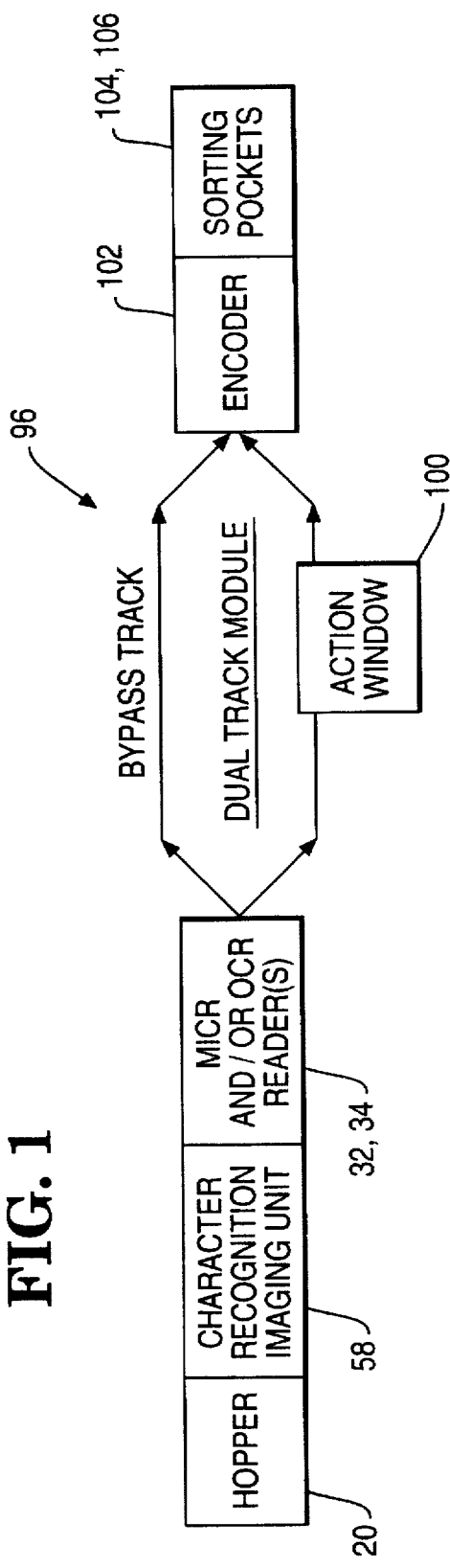
FIG. 1 is a simplified block diagram of an image based, dual path, item processing system representing a preferred embodiment of the present invention.

Referring now to FIG. 1, there is seen, in simplified block diagram form, an image based, dual path, item processing system representing a preferred embodiment of the present invention. The system includes the following principal elements for sequentially processing received documents, such as checks or deposit slips: a stacker or hopper 20, a character recognition imaging unit 58, magnetic ink character recognition (MICR) and/or optical character recognition (OCR) readers 32 and 34, a dual track module 96, an encoder 102, and sorting pockets 104, 106. In general, the function of the item processing system described herein is to receive documents such as checks and deposit slips, and, in a single document pass realized through utilization of the dual path module, mechanically read certain data from the documents.

In operation, documents are fed into the automatic hopper 20 and thereafter provided to the character recognition imaging unit (REC) 58 which images the front face of the document and undertakes an electronic search for a specific area, for example an area containing characters such as the $ symbol on a check, known as the courtesy amount (CA), to be recognized on the document. An attempt is then made to recognize the characters, which may be printed or possibly handwritten. Present state-of-the-art recognition performance typically results in a 50% correct read rate, i.e., approximately 50% of the documents fed through REC 58 could be fed directly to a downstream MICR encoder 102. However, approximately 50% of these documents would require human intervention to correctly decipher the characters appearing on the document prior to encoding.

The recognition correct read rate may be improved through the utilization of a separate piece of hardware, not shown, which performs the recognition of accompanying adding machine tapes, or looks up letter addresses in a database. Data received from the adding machine tapes or database is merged together with the data generated by REC 58 to produce a resultant data stream having an improved recognition correct read rate.

The document thereafter enters a module containing either MICR reader 32, OCR reader 34, or for optimal performance, both MICR and OCR readers 32 and 34. For a variety of reasons, situations occur whereby MICR and OCR operations fail to successfully read all characters and human intervention is required to properly interpret document data required by the image processing system. Typically, 0.75% of all documents being processed through the MICR/OCR module will require human processing.

The document then enters the dual track module 96 wherein the document is directed into one of two paths depending upon the success or failure of the read operations performed by REC 58, MICR reader 32 and OCR reader 34. The document is directed along a first "bypass" path through the dual path module 96 directly to encoder 102 if the courtesy amount has been correctly read by REC 58 and MICR data contained on the document is correctly read by the MICR/OCR module.

If either the courtesy amount or MICR data is not completely recognized by REC 58 or the MICR/OCR module, respectively, the document is directed into a second path and an action window 100 within the second path which presents the document to an operator for correction via conventional data entry procedures. The action window may present the document requiring correction directly to the operator, or an image of the document can be displayed to a local operator via a local video monitor or a remotely located operator via a LAN connection. Following correction of the document by the operator the document is provided to encoder 102, merging the corrected document into the stream of documents routed through the bypass path.

Within encoder 102, documents undergoing processing are encoded with MICR character data as required either as a result of the character recognition process performed by REC 58 or the operator-directed process performed at action window 100. Encoded information may include the courtesy amount, for example. Following encoding, processing is completed with the delivery of the document to sorting pockets 104, 106.

Detailed Description of Item Processing System

Figure 2A:
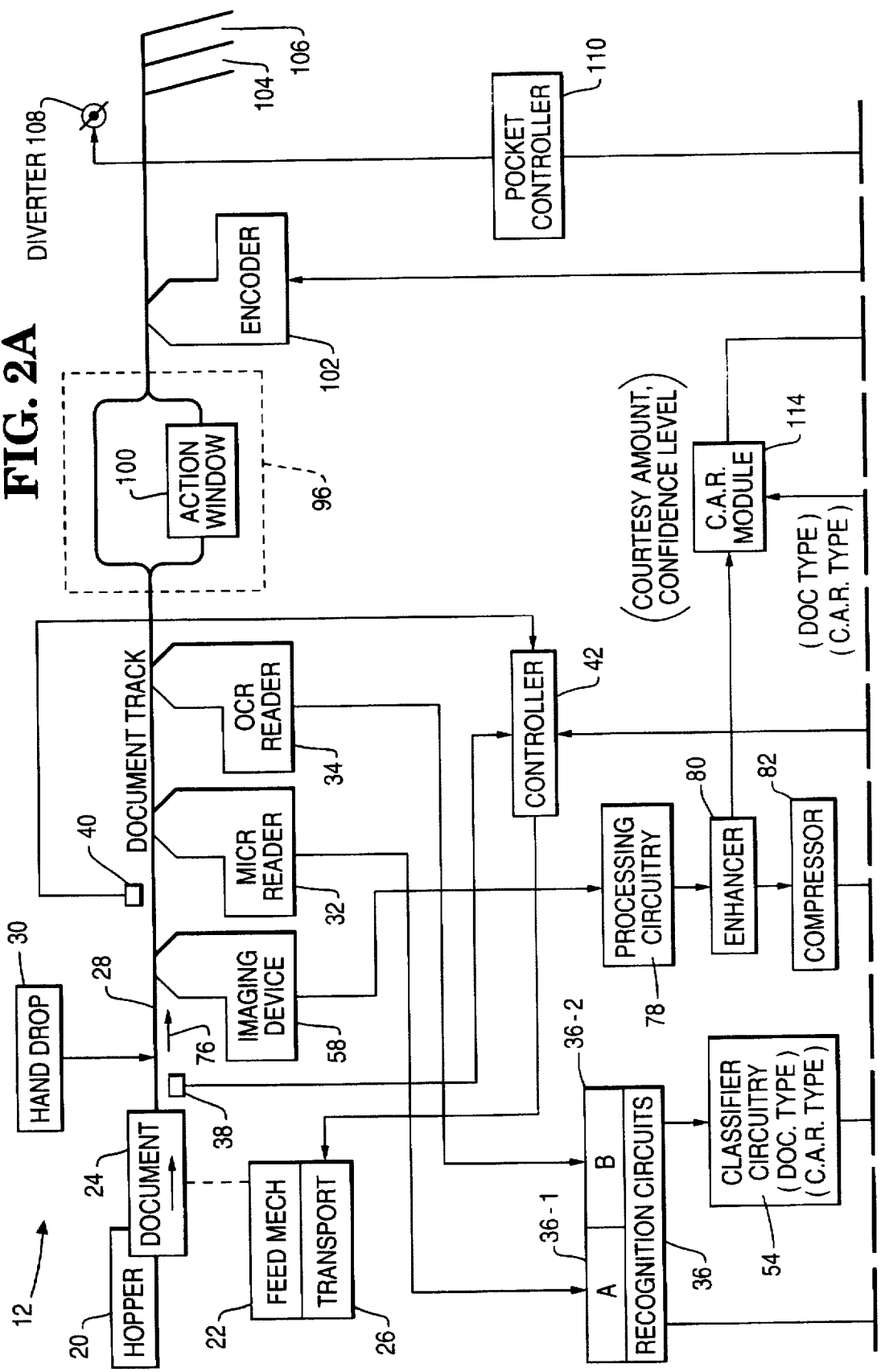

The item processing system is shown in greater detail in FIGS. 2A and 2B. A batch of documents is placed in a stacker or hopper 20 (FIG. 2A), and a conventional feed mechanism 22 is used to pick a document 24 from the hopper 20, and thereafter, a conventional transport mechanism 26 moves the document 24 along a document track 28 at a constant velocity and at a rate of 200 documents per minute in the embodiment described.

A conventional hand-drop, feed mechanism 30 (FIG. 2A) is provided to enable individual documents 24 to be fed manually into the document track 28, when, for example, a document 24 jumps out of the track 28 and has to be fed again into the document track 28.

As each document 24 is moved along the track 28, it is brought into operative, reading relationship with a conventional, character recognition imaging device 58, which attempts to identify handwritten or printed characters carried on a document 24.

There are sensors such as 38 and 40, for example, which are positioned along the track 28 (FIG. 2A) to check on the status of each of the documents as it is moved along the track 28. The sensors 38 and 40 are coupled to a conventional controller 42 which may include a microprocessor (not shown) to perform the routine tasks associated with moving documents along the track, such tasks as controlling the feed mechanism 22 and the transport mechanism 26, for example. The controller 42 is coupled via an interface 46 to a system processor 44 (FIG. 2B) which coordinates the operation of the item processing system.

Continuing with the example being described, when the sensor 38 (FIG. 2A) indicates that a document 24 approaches imaging device 58, processor 44 receives this notification from the controller 42 as just described, and assigns a document reference number (DRN) to the data associated with the document 24 to be read. This DRN is unique for each document and will be used by the item processing system to identify the various data associated with a document 24 and to facilitate the processing of the documents in the system 10.

Processing circuitry 78 receives the scan output generated by imaging device 58, a series of picture elements or pixels, and converts the received data into a stream of bytes or bits of data. Because the details and operation of imaging device 58 and processing circuitry 78 are conventional, they need not be described in any further detail. The image data output generated by processing circuitry 78 is thereafter provided to an enhancer 80 (FIG. 2A), whose output, in turn, is fed into a compressor 82. Enhancer 82, a conventional image processing element, is a circuit which is used to eliminate unnecessary background information and to make the pertinent data stand out from background information, for example. The compressor 82 is also a conventional circuit which receives the enhanced data from the enhancer 80 and eliminates that data which is "meaningless" or "redundant" and thereby "compresses" the remaining data to produce compressed, digitized-image data which reduces the amount of transmission time necessary to transmit the data associated with an image of a document 24 and which also reduces memory storage requirements. The output of the compressor 82 is fed via a conventional interface 84 to the RAM 50 of processor 44, where this image data associated with a document 24 is stored temporarily by its associated DRN. As an optional feature, a second imaging device and associated circuitry (not shown) may be used to image the rear of a document 24 as described herein.

The image data derived from the imaging device 58 (FIG. 2A) is utilized to perform machine character recognition to ascertain the courtesy amount on the documents 24 being processed. The image data coming from the enhancer 80 (prior to compression) is fed into a courtesy amount recognition (C.A.R.) module 114 where this function is performed. It also should be recalled that the classifier circuitry 54 provides certain data about each document, data such as document type, height, and size, location of the courtesy amount, and whether the courtesy amount is machine or handwritten, for example; for ease of discussion, this data shall be referred to hereinafter as C.A.R. type data.

The C.A.R. type data as developed was stored in the RAM 50 of processor 44 (FIG. 2A) along with the DRN which was assigned to the associated document 24. A sensor such as 38, positioned along the document track 28, produces a signal to indicate the start of data for the document 24 approaching the imaging device 58, and this signal is used by the processor 44 to forward the C.A.R. type data along with the DRN to the C.A.R. module 114 via the interface 116.

The C.A.R. module 114 (FIG. 2A) may be conventional and includes the necessary data buffers to store the data received and the processors and associated circuitry to effect character recognition. Some typical character recognition circuits and techniques are shown in U.S. Pat. Nos. 3,603,390; 3,629,829; 3,878,509; and 3,882,463. The C.A.R. module 114 then reads the courtesy amount using the image data received from the enhancer 80 and outputs the courtesy amount read to processor 44 via the interface 118 and stores the data momentarily in the RAM 50 by the DRN. For each individual number of the courtesy amount read, there is an associated number developed to indicate the confidence level associated with that number read. For example, a number 9 may be used to indicate a high probability of correctness of reading, while the number 1 may indicate a low probability of correctness. A low probability of correctness may be used in subsequent processing in the system 10 to facilitate the location of errors if errors develop in the usual reconciliation process. Naturally, a low probability of correctness of reading, or individual numbers of the monetary amount not being read at all would be tagged (with a 0, for example) to indicate the need for data completion. The MICR or OCR data read from the recognition circuitry 36 and the courtesy amount along with the confidence level of each of the numbers in the courtesy amount are combined by DRN in processor 44 and stored by its associated DRN.

After a document 24 is read by imaging device 58 it is moved into operative relationship with a conventional magnetic ink character recognition (MICR) and/or optical character recognition (OCR) reader 32 and 34. The MICR and OCR readers are positioned along the track 28 so as to read magnetic or optical characters on the document 24 as the document 24 is moved thereby. The character line on the document contains, for example, the identification of the associated bank number (transit routing number), customer's account number, check number, and other coding numbers which provide information as to the type of document i.e., whether it is a check, deposit slip, etc., the size of the document, where the courtesy or monetary amount is located, etc. The output of MICR and OCR readers 32 and 34 are provided to conventional recognition circuitry 36 which interprets the data read. The data from the reader 32 and 34 is processed by the recognition circuitry 36. Typical MICR data such as bank number, customer account number, and check number, for example, coming from the recognition circuitry 36 pass through the interface 48 to the random access memory (RAM) 50 of the processor 44 where it is stored therein according to the now-available DRN.

The document 24 may include additional data on the MICR line to facilitate the processing of documents within the item processing system. This additional data, determined by the financial institution or bank which supplies the documents 24 and uses the system may include, for example, a document-type number which indicates whether the document is a check, deposit slip, etc., a size number which indicates the physical size of the document; a courtesy amount recognition (C.A.R.) type number which indicates whether the courtesy or monetary amount on the document is machine printed or hand written; a location number which indicates the location on the document of the courtesy amount, and the height of the document. This additional data is read by the recognition circuitry 36 and arranged or classified by classifier circuitry 54 which forwards this additional data via the interface 56 to the RAM 50 where it is stored by the associated DRN.

Processor 44 (FIG. 2B) includes the interfaces 48, 56, and 84 already mentioned, a read only memory (ROM) 86, the RAM 50, a display such as a cathode ray tube (CRT) 88, a keyboard (KB) 90, a processor (MP) 92 and interface and control logic 94. The processing routines associated with processor 44 may reside in the ROM 86; however, the routines are loaded, more typically in the RAM 50 from disc or tape storage (not shown), for example, as part of a conventional start-up procedure. The CRT 88 is used to provide communication with an operator who uses a keyboard 90 to enter data or instructions. Interface and control logic 94 provides the interconnection among the various components of the processor 44 to enable it to function, conventionally, as an "intelligent" application processor. The form of the processor 44 shown in FIG. 2B is utilized to portray the various functions performed thereby, and the actual form of the processor 44 may be different.

Continuing with the movement of a document 24 along the document track 28, after a document 24 passes MICR and OCR readers 32 and 34 (FIG. 2A), it is moved along one of two paths through dual path module 96, which will be explained in greater detail below with reference to FIGS. 3A and 3B.

Following delivery through dual track module 96, document 24 is moved along the document track 28 and approaches the encoder 102. The encoder 210 is conventional, and in the embodiment described, it prints or encodes the courtesy amount, for example, for that document in MICR ink on the document itself. The encoder 102 may have its own feed mechanism (not shown) associated therewith to enable the document 24 to be moved in printing relationship with the encoder 102; this is due to the fact that the feed rate effected by the transport mechanism 26 is generally different from that required by the encoder 102.

Normally, following processing, the documents 24 are diverted sequentially into a single pocket 104 by a diverter 108 which is controlled by a pocket controller 110 which is coupled to the processor 44 via the interface 112. If the processor 44 wishes to single out one or more documents 24 (for various processing reasons) at this point, the processor 44 then sends out the appropriate instruction to the pocket controller 110 which causes the affected documents to be diverted into the reject pocket 106. As an optional feature, additional pockets like 104 may be provided to provide sorting capability to the system.

Additional details of many of the elements of the item processing system described above, and the operation of those elements, are provided in U.S. Pat. No. 4,523,330, incorporated herein by reference. U.S. Pat. No. 4,523,330, entitled "BANKING SYSTEM AND METHOD" and issued to John D. Cain, is assigned to NCR Corporation.

Dual Track Module

Figure 3A:
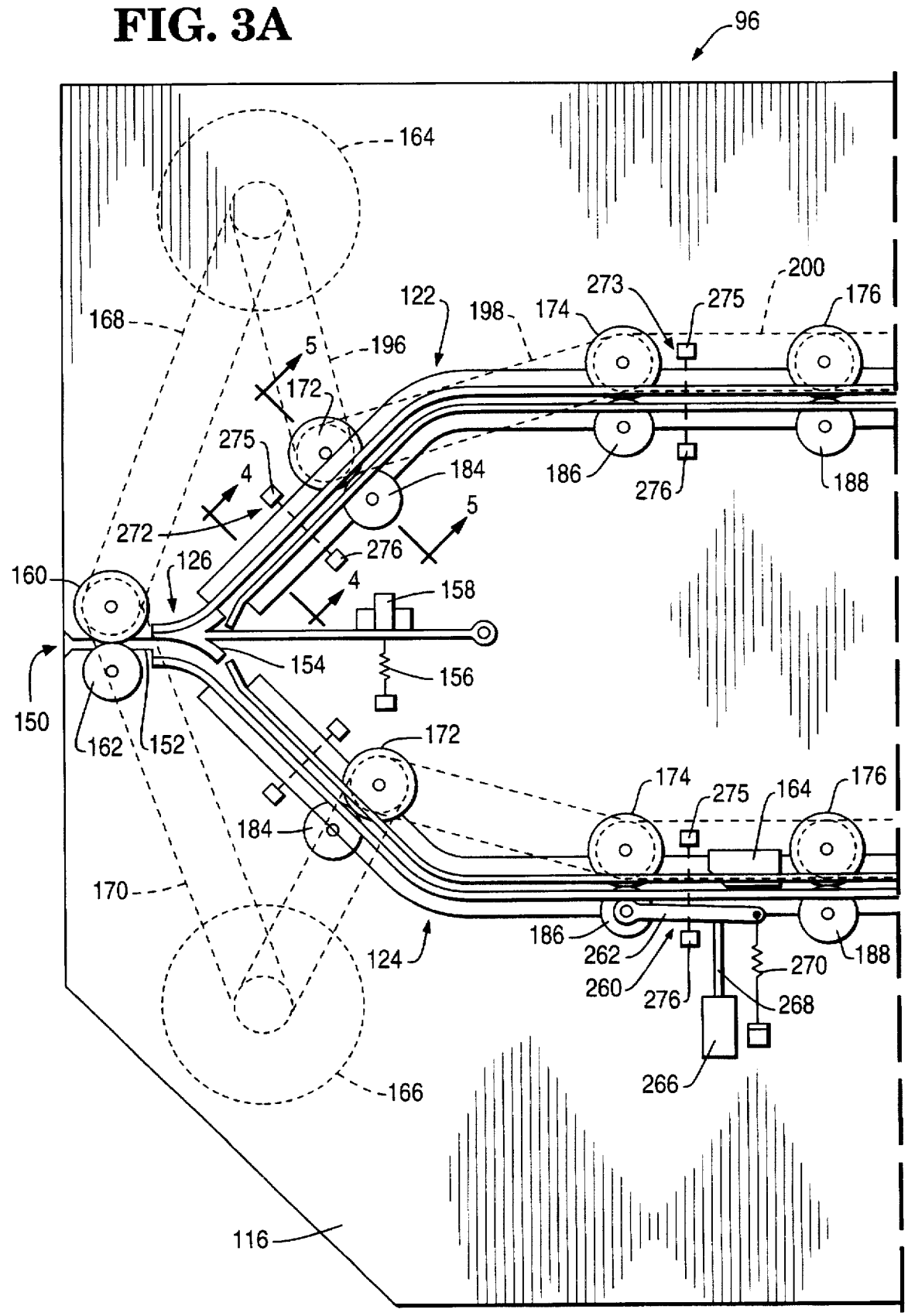
FIGS. 3A and 3B, taken together, constitute a plan view of dual path mechanism 96 shown in FIGS. 1 and 2A.
Figure 3B:
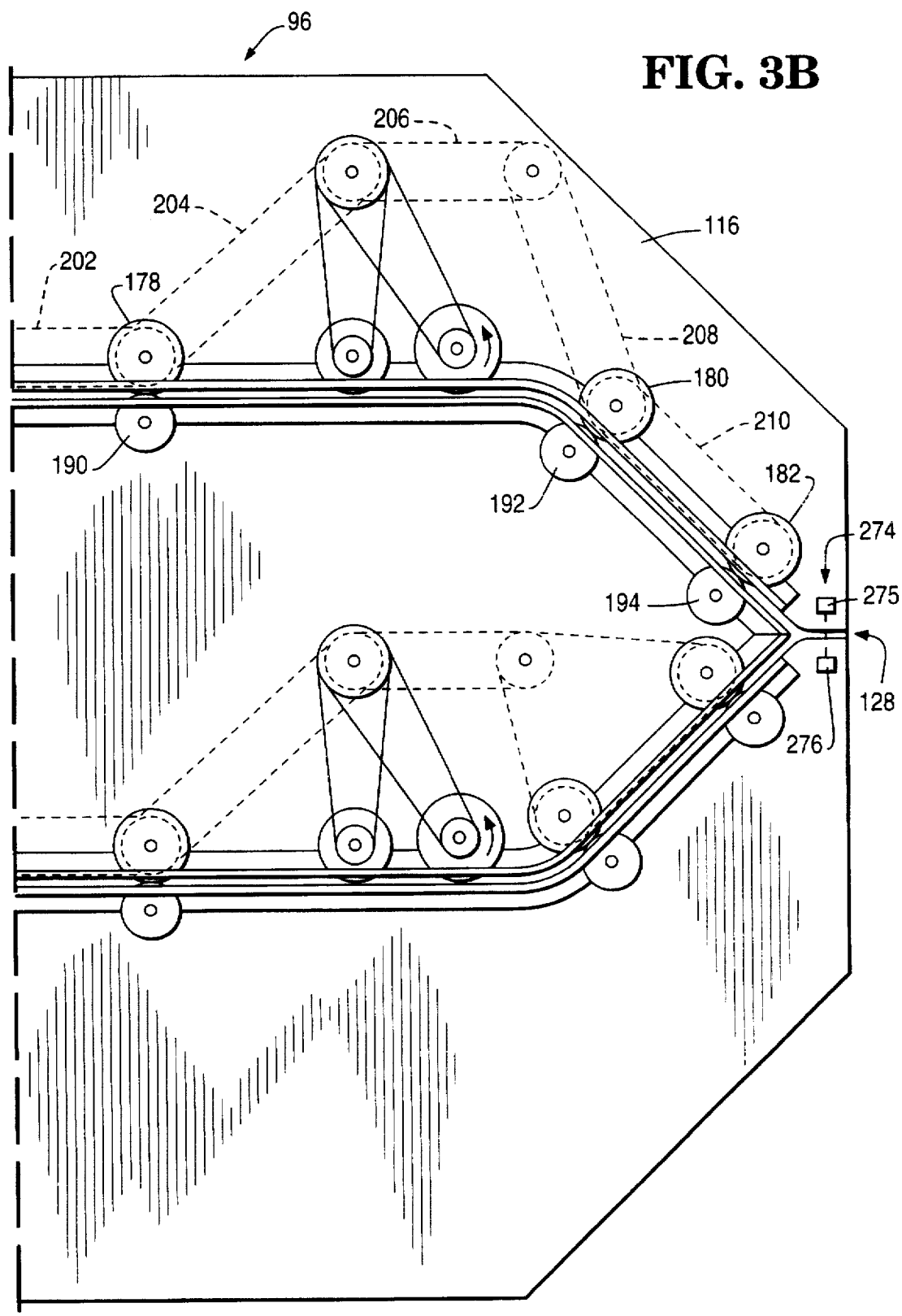

Referring now to FIGS. 3A and 3B, there is shown, in plan view, dual path module 96. The dual path mechanism, predictably, includes two paths or tracks 122 and 124. These paths extend from a point of divergence 126 past to an exit 128. A document enters the apparatus of the present invention from document track 28 at an entry point 150 and passes along a first path or track 152 to the point of divergence 126, where it is directed to one or the other of the paths 122 or 124 by a selector 154 which is biased to permit document travel along one path by means such as a spring 156, and which can be shifted to cause document travel along the other path by energization of a solenoid 158.

Figure 4:
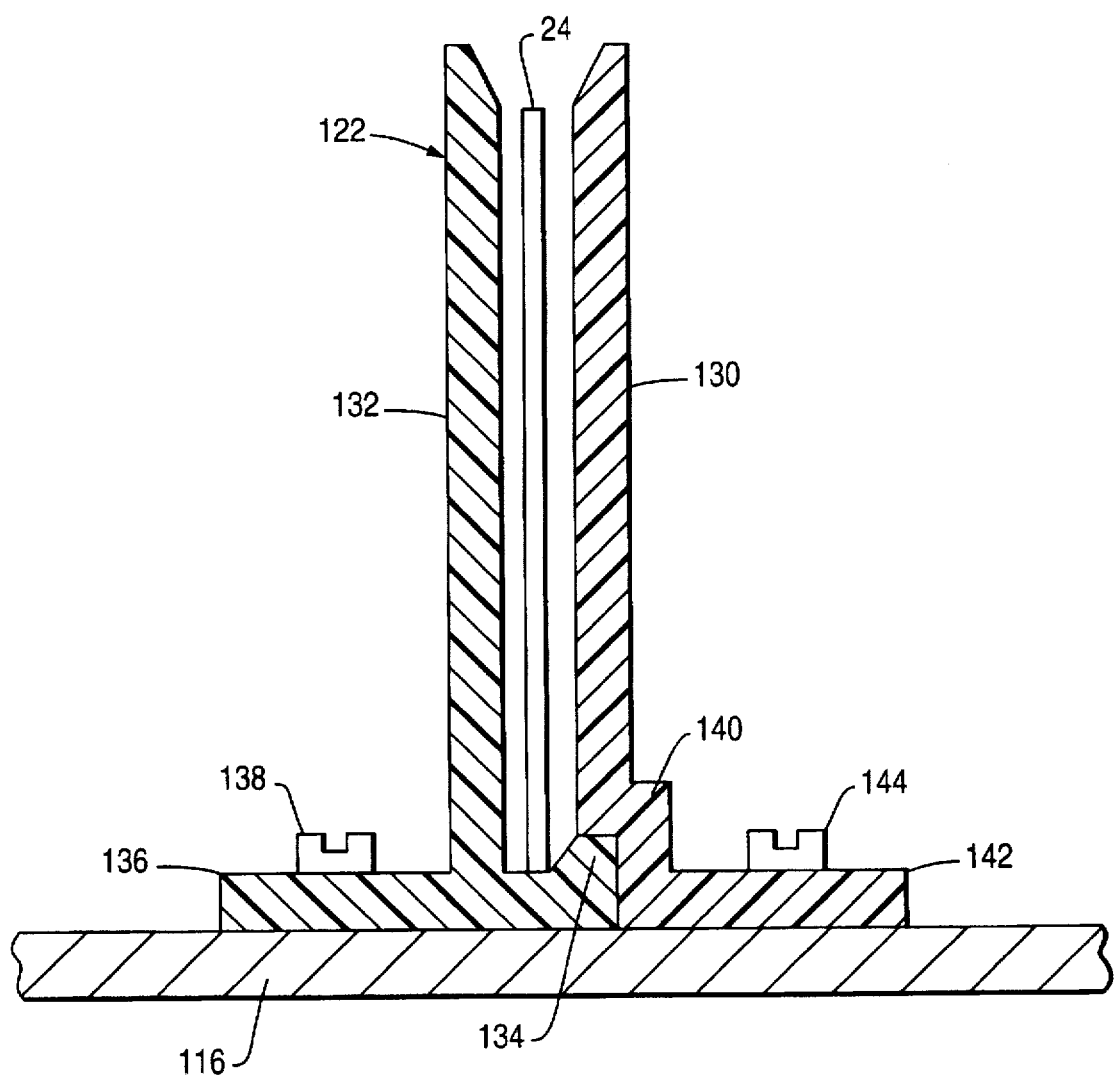
FIG. 4 is a cross-sectional view, taken along line 4—4 of FIG. 3A to show additional details of dual path mechanism 96.

The paths 122 and 124 may be of any suitable configuration which guides and propels documents along a desired route between the point of divergence 126 and the exit 128. Path 122 may, for example, comprise a pair of spaced side walls 130 and 132 (FIG. 4). The side wall 130 has a trough portion 134 which is integrally formed therewith to form the bottom of the track 122. The side wall 132 also has a flange portion 136 extending therefrom to enable the side wall 132 to be secured to the base 116 by fasteners such as the fasteners 138.

The side wall 130 of the track 122 has a general cross-sectional shape shown in FIG. 4, including an angled or offset portion 140 to accommodate the trough portion 134 of the side wall 132. The side wall 130 also has a flange portion 142 to enable it to be secured to the base 116 by fasteners such as fasteners 144. In the embodiment described, the track 122 is oriented in a vertical plane to enable a document such as the document 24 to be guided thereby to have a lower edge glide over the trough portions 134. The track 122 may be made of a plurality of sections (of plastic material, for example) having the cross-sectional shape described in relation to FIG. 4 to provide the necessary length of the track 122 for a particular application. It will be realized that the track 124, as well as the track 152 extending from the entry means 150 to the point of divergence 126 of the tracks 122 and 124, may be configured in a manner similar to that described above for the track 122.

In the illustrated embodiment, a document 24 is driven along the track 152 from the entry means 150 to the point of divergence 126 by a drive roller 160 cooperating with a pinch roller 162. The drive roller 160 may be driven by either or both of two motors 164 and 166 by means of belts 168 and 170. The pulleys on the shaft of the drive roller 160 which transmit its driving force from the motors 164 and 166 and the belts 168 and 170 include "over-run" clutches so that speed differences between the motors (including failure of one of the motors) can be accommodated. As will subsequently be described in greater detail, the motor 164 is employed to drive documents along the path 122, and the motor 166 is employed to drive documents 24 along the path 124.

The means for moving a document along the path 122 include a plurality of drive rollers 172, 174, 176, 178, 180 and 182, with cooperating pinch rollers 184, 186, 188, 190, 192 and 194. All of the drive rollers are driven by the motor 164 acting through transmission means such as a series of belts 196, 198, 200, 202, 204, 206, 208 and 210.

Figure 5:
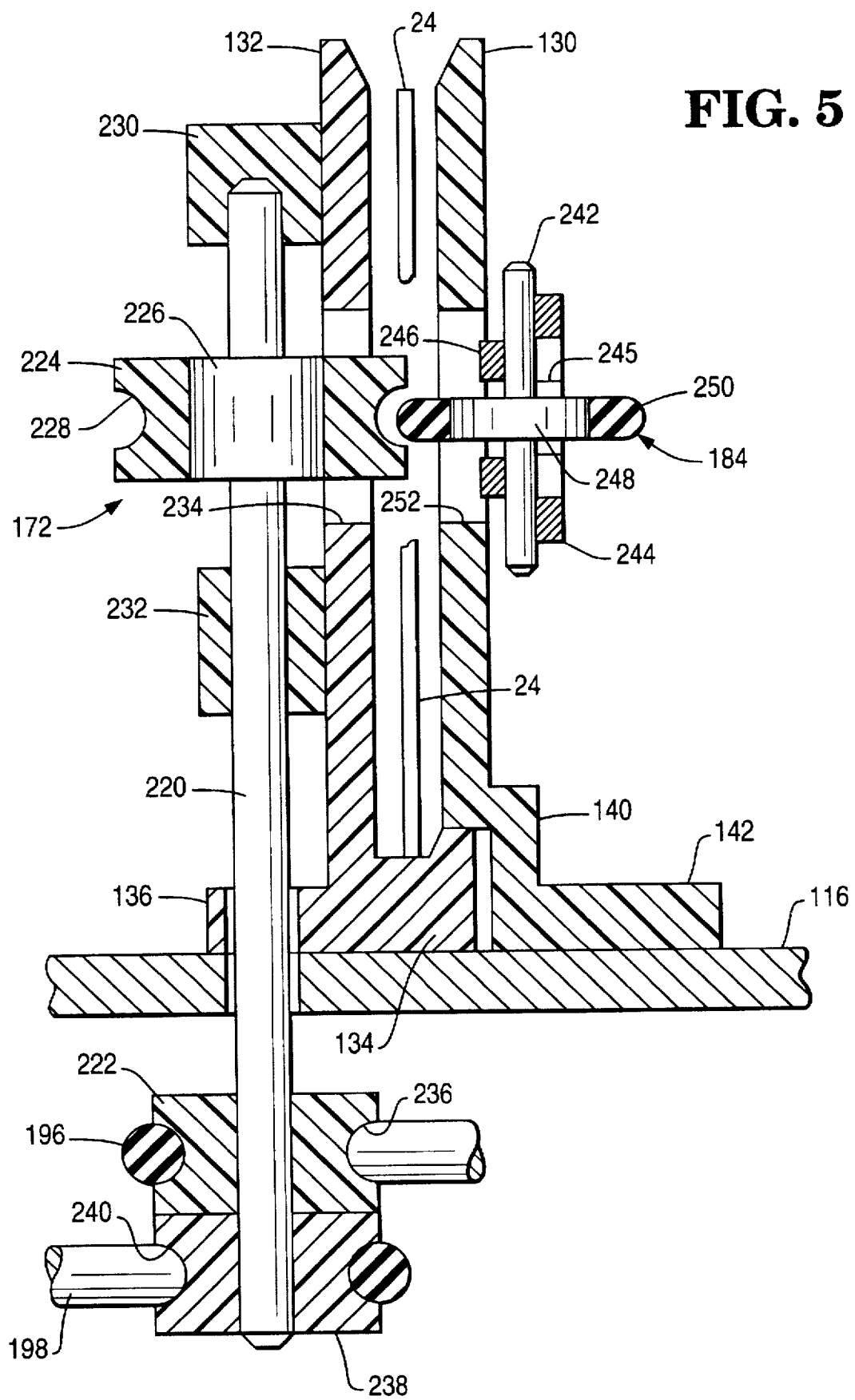
FIG. 5 is a cross-sectional view, taken along line 5—5 of FIG. 3A to show additional details of dual path mechanism 96.

In FIG. 5, the drive roller 172 and cooperating pinch roller 184, together with associated structure, are shown in greater detail. The drive roller 172 has a shaft portion 220 having a drive pulley 222 secured to one end thereof and a wheel or tire 224 formed on an enlarged portion 226 of the shaft 220. The tire 224 is preferably made of plastic material and has an annular recess 228 formed around the perimeter thereof. The shaft 220 is rotatably supported in conventional bearing mounts 230 and 232 which are detachably secured to the side wall 132. The drive roller 172 is located on the side wall 132 so that its periphery extends through a recess 234 in side wall 132 to about midway into the track space between the side walls 130 and 132. The drive pulley 222 has an annular recess 236 formed around the perimeter thereof to receive the endless belt 196 which is circular in cross-section and which is drivingly retained in the recess 236. This belt operatively couples the pulley 222 to the motor 164. The second pulley 238 has an annular recess 240 to receive the second endless belt 198 which operatively couples the pulley 238 to a corresponding pulley which drives the drive roller 174.

The pinch roller 184 shown only schematically in FIG. 3A is shown in more detail in FIG. 5. The roller 184 has an axle 242 which is rotatably supported in a plate 244 which is adjustably secured to the side wall 130. The plate 244 has an opening 245 therein to enable the roller 184 to the mounted therein. The roller 184 may be mounted in the plate 244 by having certain flange portions like 246 formed from the plate 244 itself, thereby forming the supports for the axle 242 as is conventionally done. The axle 242 has an enlarged cylindrical portion 248 around which is formed a sleeve or tire 250 which may be made of a plastic material such as urethane. The tire 250 of the pinch roller 184 has an outer circumference whose radius of curvature is concentric with the radius of curvature of the recess 228 as is shown best in FIG. 5. When the pinch roller 184 is properly positioned with regard to the drive roller 172, it passes through an opening 252 in side wall 130 and its outer diameter is advanced slightly into the recess 228 of the drive roller 172 as shown in FIG. 5. The pinch roller 184 is resiliently biased toward the drive roller 172 by the plate 244 which is mounted in cantilever fashion.

When there is no document such as 24 passing in the track 122 between the side plates 130 and 132, the pinch roller 184 does not rotate. This minimizes wear on the roller 184 and eliminates the need for bearings for mounting it. When a document 24 passes between the drive roller 172 and the pinch roller 184, it is driven therebetween by partially deforming the sheet in the area of the recess 228 to move the sheet downstream as previously described. The rotating axes of shaft 220 of the drive roller 172 and axle 242 of the pinch roller 184 may be tilted about 2 or 3 degrees in planes parallel to the side walls 130 and 132 so as gently to drive a document 24 to the bottom of the track 122 as it is moved downstream.

The position and length of a document 24 in the path 122 may be determined by a plurality of sensors 272 and 273, as well as a sensor 274 positioned adjacent to the exit 128. Each sensor comprises a radiation source 275 and a radiation detector 276. The sources and detectors are secured to the walls 130 and 132 which are apertured to permit radiation paths to extend from each source 275 to its corresponding detector 276. Interruption of this path by a passing document 24 provides indication of the presence of the document, and the duration of such interruption enables a determination to be made of the length of the document.

Path 122, referred to as the "bypass" track, simply delivers identified documents from point of divergence 126 to exit 128. Path 124 includes additional structure which halts movement of a document directed through path 124 within an "action window" to permit an operator to perform corrective action on the document via conventional data entry procedures. The cooperating drive roller 174 and pinch roller 186 of path 124 differ somewhat in construction and operation from the other drive roller-pinch roller combinations in either path 124 or any of the roller combinations, including the 174-186 roller combination, in path 122. The pinch roller 186 in path 124 is rotatably mounted at one end of a toggle 260 (FIG. 3A) pivoted between its ends on a stationary pivot pin 262 secured to the path 124. The other end of the toggle 260 is positioned to engage a pad 264 in the path 124 to exercise a blocking function to halt movement of a document 24 which is being fed along said path. The toggle 260 is operated by a solenoid 266 acting through a plunger 268 connected to said toggle. A spring 270 biases the toggle to one of its two operative positions in which the pinch roller 186 cooperates with the drive roller 174 through an aperture in the wall 130 to cause feeding of a document through the selected track. Energization of the solenoid 266 acts through the plunger 268 to separate the pinch roller 186 from the drive roller 174 and to cause the toggle 260 to the toggle 260 to move through an aperture in the wall 130 to engage the pad 264, thereby acting as a pinch gate to halt document feeding. The document 24 will be held against further movement until the solenoid 266 is deenergized.

Path 124 may be configured to present the document 24 requiring correction directly to the operator, or may include additional structure, not shown, to present an image of the document to a local operator via a local video monitor or a remotely located operator via a LAN connection. Following correction of data, solenoid 266 is deenergized releasing document 24 into path 124 for delivery to encoder 102.

Alternate Embodiments of the Invention

Figure 6:
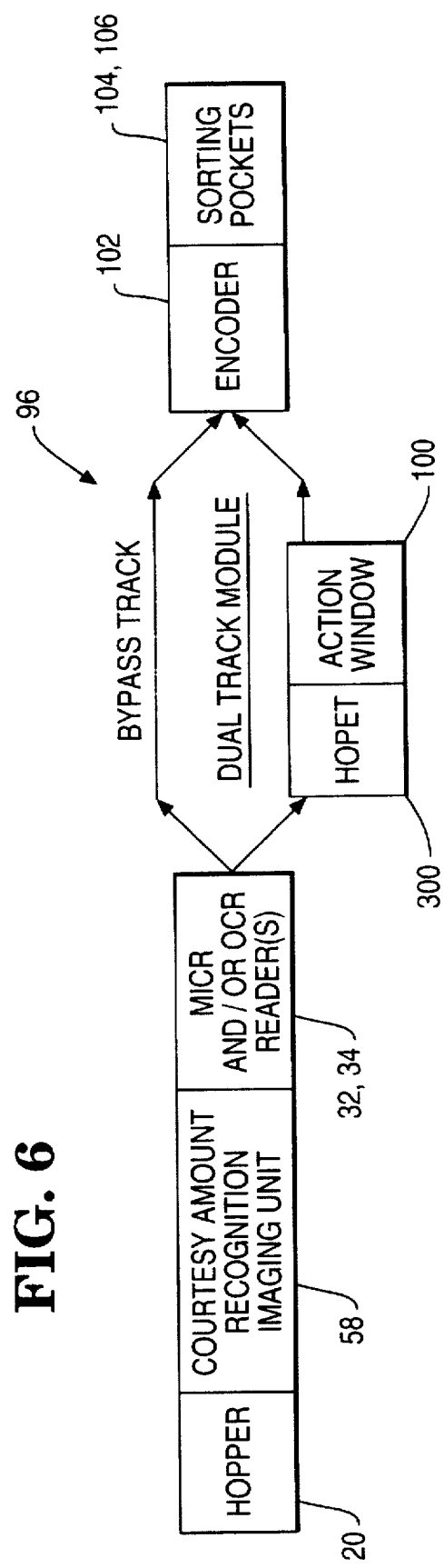
FIG. 6 is a simplified block diagram of an image based, dual path, item processing system representing a second preferred embodiment of the present invention, and including a document storing or buffering device 200 positioned in one path of dual path mechanism 96.

FIG. 6 is a simplified block diagram of an image based, dual path, item processing system representing a second preferred embodiment of the present invention. The processing system shown is similar to that shown in FIG. 1 and described above but includes a document storing or buffering device 300, referred to herein as a Hopet device, positioned in one path of dual path mechanism 96. Hopet device 300 allows for the buffering of documents directed to action window 100, thereby removing a potential system bottleneck at the action window when numerous documents are directed to the action window.

Figure 7:
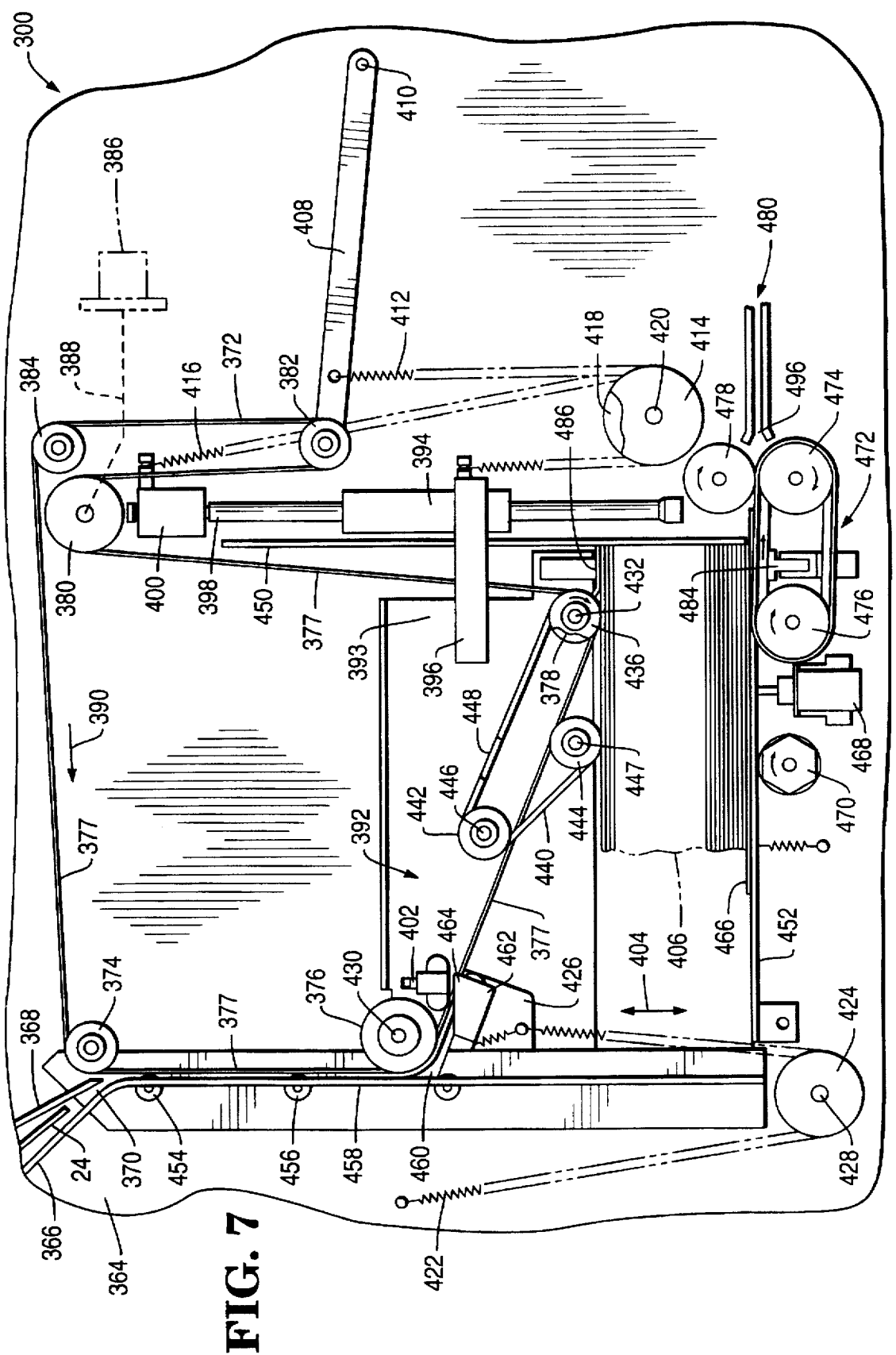
FIG. 7 is a plan view of the document storing or buffering device 300 shown in FIG. 6.

FIG. 7 is a plan view of the document storing or buffering device 300 shown in FIG. 6. The document buffering device 362 (FIG. 7) has a support plate 364 which is positioned in a horizontal plane in the embodiment described. A converging track composed of side walls 366 and 368, upstanding from the support plate 364, is used to direct a document 24 received via dual track module document track 124 (FIGS. 3A and 3B) to the entrance area 370 of the buffer 300. The buffer 300 also includes a wide, endless belt 372 which is mounted on pulleys 374, 376, 378, 380, 382 and 384 as shown, with pulley 380, for example, being driven by motor 386 (by conventional drive means 388) to move the belt 372 in the direction of arrow 390. Pulleys 374 and 384 are rotatably mounted on rods which are perpendicularly upstanding from the support plate 364 while pulleys 376 and 378 are mounted on a generally-rectangular, moveable plate 392. The moveable plate 392 is secured at one side 393 to a linear or sleeve bearing 394 by an arm or bracket 396. The sleeve bearing 394 is slidably mounted on a rod 398 having one end fixed to a mounting block 400 which is secured to the support plate 364. The side of moveable plate 392 opposite to side 393 has a rotatable wheel 402, depending from the lower side thereof, to enable the moveable plate 392 to be supported and reciprocated along the directions shown by double arrow 404. The moveable plate 392 is moved along the directions of double arrow 404 to accommodate varying amounts of documents 24 which are stored in the document stack 406. In this regard, pulley 382 is rotatably mounted on one end of an arm 408 whose remaining end is pivotally supported on a rod 410 upstanding from the support plate 364. A tension-type spring 412, having one end secured to the arm 408, passing around upper pulley 414, and having the remaining end secured to the bracket 396 keeps the tension on the belt 372 relatively constant as the size of the document stack 406 changes, due, for example, to documents entering the stack 406 at a rate faster or slower than they are withdrawn therefrom. A second, tension-type spring 416, having one end secured to the mounting block 400, passing around lower pulley 418, and having the remaining end secured to bracket 396 maintains a bias on the stack 406 to urge it in a direction towards the bottom of FIG. 7. The pulleys 414 and 418 are rotatably mounted on a rod 420 which is perpendicularly upstanding from the support plate 364. A third tension spring 422, having one end secured to the support plate 364, passing around pulley 424, and having the remaining end secured to a block 426, which in turn is secured to the moveable plate 392, maintains an equalizing bias on the left side (as viewed in FIG. 7) of moveable plate 392 to enable the sleeve bearing 394 to slide freely on the rod 398. Pulley 424 is rotatably mounted on a rod 428 which is perpendicularly upstanding from support plate 364.

As previously mentioned, the moveable plate 392 (FIG. 7) is utilized to accommodate the varying amounts of documents 24 in the stack 406. The pulley 376 is rotatably mounted on rod 430 which is perpendicularly upstanding from the moveable plate 392.

Pulley 378 (FIG. 7) is actually a cylindrically-shaped pulley which is fixed to shaft 432 to rotate therewith. The shaft 432 has one end which is rotatably mounted and retained in a bearing 434 which is secured to the moveable plate 392. An upper roller 436 and a lower roller 438 are mounted on opposed sides of roller 378 and are fixed to the shaft 432 to be rotated thereby whenever the roller 378 is rotated. An "O"-ring-type, endless belt 440 is mounted on the pulley 436, on pulley 442, and on pulley 444 in the general orientation shown in FIG. 7. Pulley 442 is rotatably mounted on a rod 446 which is upstanding from the moveable plate 392, and pulley 444 is similarly mounted on a rod 447. The belt 372 lies between the endless belts 440 and 448 and is used to drive them in a direction which moves or aligns the documents 24 in the stack 406 towards the side wall 450 (FIG. 7). The two rollers like 444 and the rollers 436 and 438 along with endless belts 440 and 448 apply a resilient bias to the stack 406 to urge the stack towards the end wall 452. A suitable time-out circuit (not shown) could be used to shut off the motor 386 after a predetermined amount of elapsed time after a document 24 enters the entrance area 370 to minimize the "scrubbing" action by endless belts 440 and 448 on the documents 24 in the stack 406.

After a document 24 enters the entrance area 370 (FIG. 7), it is transported between the wide belt 372 and idler rollers like 454 and 456 which are rotatably supported in the side wall 458. A deflector plate 460, which is secured to the block 426 to move with the moveable plate 392, is used to deflect the documents 24 towards the endless belts 440 and 448. A document bowing member 462 is secured to the block 426 and has a finger end 464 which is located at a height equal to approximately half the height of a document 24 to bow the document 24 so as to put a concave bend along its height for the entire length of the document as it is moved thereby. The bowing of the document 24 "stiffens" it so that it can be extended without collapsing to contact the belts 440 and 448 and be moved by them into the stack 406.

The documents 24 in the stack 406 (FIG. 7) rest against a plate 466 which is under the control of a solenoid 468. The plate 466 is suitably apertured to enable a rotating "jogger" 470 to settle and adjust the documents 24 in the stack 406 and to enable a pick-off belt 472 to pick the first document 24 in the stack 406 when the solenoid 468, for example, is de-energized, thereby permitting the plate 466 and the stack 406 to move towards the end wall 452. When the solenoid 468 is energized, it moves the plate 466 and the stack 406 away from the pick-off belt 470 to prevent the feeding of documents 24 from stack. The pick-off belt 472 is mounted on rollers 474 and 476, and a stripper roller 478 prevents more than one document at a time from being withdrawn from the stack 406.

Additional details of a Hopet document storing or buffering device, and the operation thereof, are provided in U.S. Pat. No. 4,555,617, incorporated herein by reference. U.S. Pat. No. 4,555,617, entitled "CONCURRENT, IMAGE-BASED, REJECT-RE-ENTRY REPAIR SYSTEM AND METHOD" and issued to Ralf M. Brooks et al., is assigned to NCR Corporation.

Figure 8:
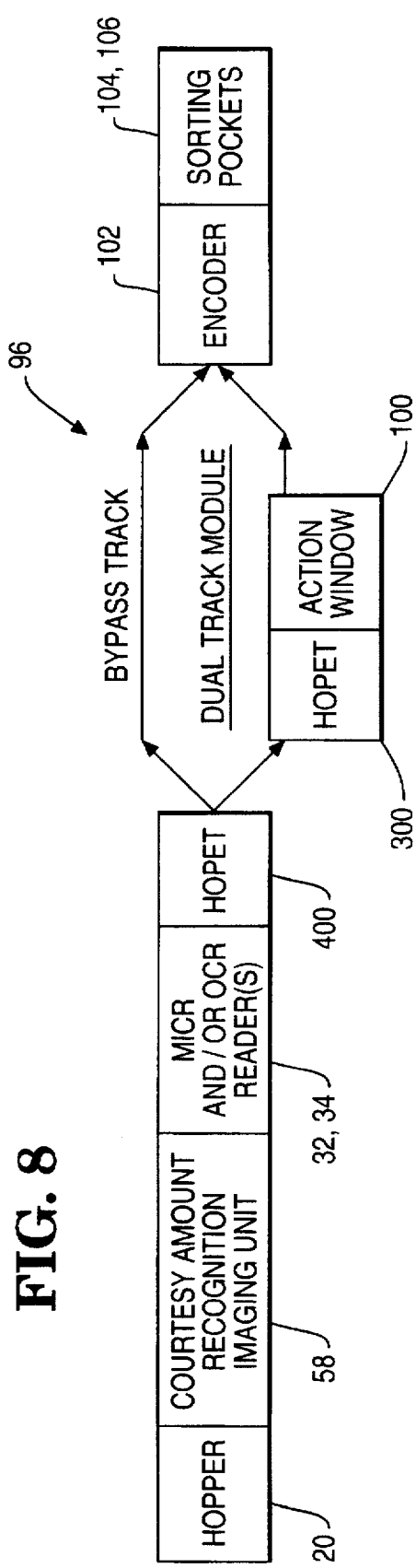
FIG. 8 is a simplified block diagram of an image based, dual path, item processing system representing a third preferred embodiment of the present invention, and including a document storing or buffering device 300 positioned before dual path mechanism 96.

FIG. 8 is a simplified block diagram of an image based, dual path, item processing system representing a third preferred embodiment of the present invention. The processing system shown is similar to that shown in FIG. 6 and described above but includes an additional document storing or buffering (Hopet) device 400 positioned in front of dual path mechanism 96. Depending upon the system document throughput, and depending upon the quality of the documents being processed, a decision concerning whether a document is directed to the bypass track or the action window may not be determined by the time the document reaches the exit of the MICR/OCR module. Hopet device 400 placed between the MICR/OCR module 32, 34 and the bypass track module 96, provides a remedy for this situation and allows continued recognition processing by several possible recognition engines until a bypass track path decision is formulated.

Figure 9:
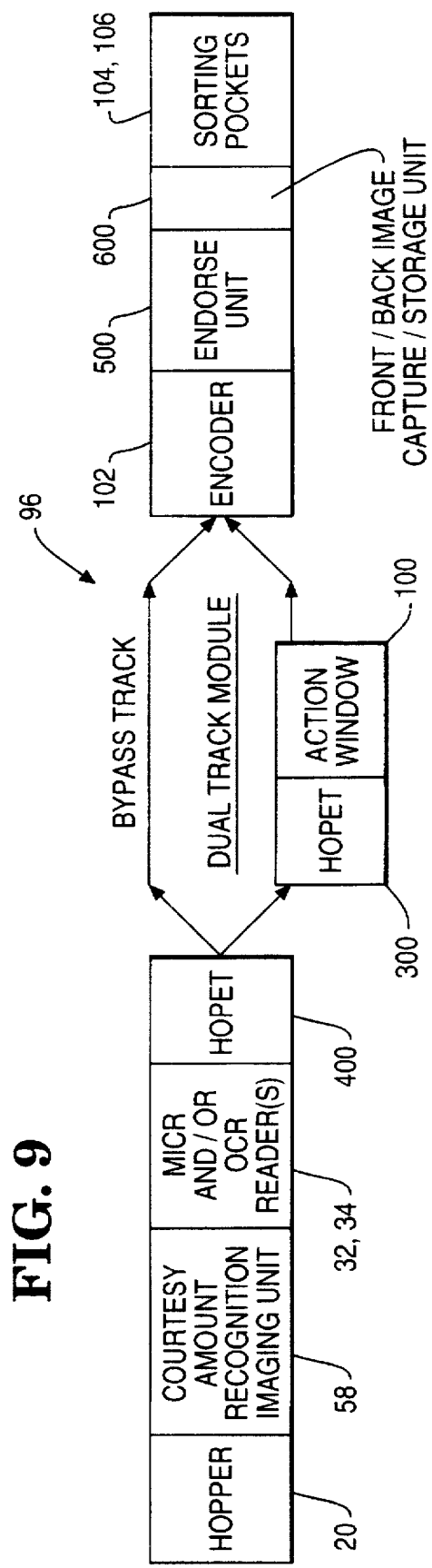
FIG. 9 is a simplified block diagram of an image based, dual path, item processing system representing a fourth preferred embodiment of the present invention, and including an endorse unit 500 and an image capture storage unit 600.

FIG. 9 is a simplified block diagram of an image based, dual path, item processing system representing a fourth preferred embodiment of the present invention. The processing system shown is similar to that shown in FIG. 8 and described above but includes an endorse unit 500 and an image capture/storage unit 600 following encoder 102.

Endorse unit 500 can be a traditional roll-on-endorse logo endorser unit or a programmable endorser unit printing an application specific alphanumeric string of characters. Alternatively, the endorse unit 500 can be a programmable unit for printing, in either a vertical or horizontal orientation, a machine readable (fluorescent or equivalent) bar code. An accompanying alphanumeric rendering of the bar code may be printed adjacent to the bar code. In another alternative, endorse unit 500 can be a programmable unit for printing a solid magnetic ink recording segment onto the document being processed; the magnetic ink segment being immediately magnetically written to by a magnetic write head.

Front/back image capture/storage unit 600 may be employed to perform a number of important functions, such as (1) providing an image replacement for a traditional microfilm reader, (2) utilizing optical MICR character recognition technology, and (3) providing an image authentication and identification function addressing the real world problems of check security and fraud, and providing a unique image identification for interchange purposes.

Figure 10:
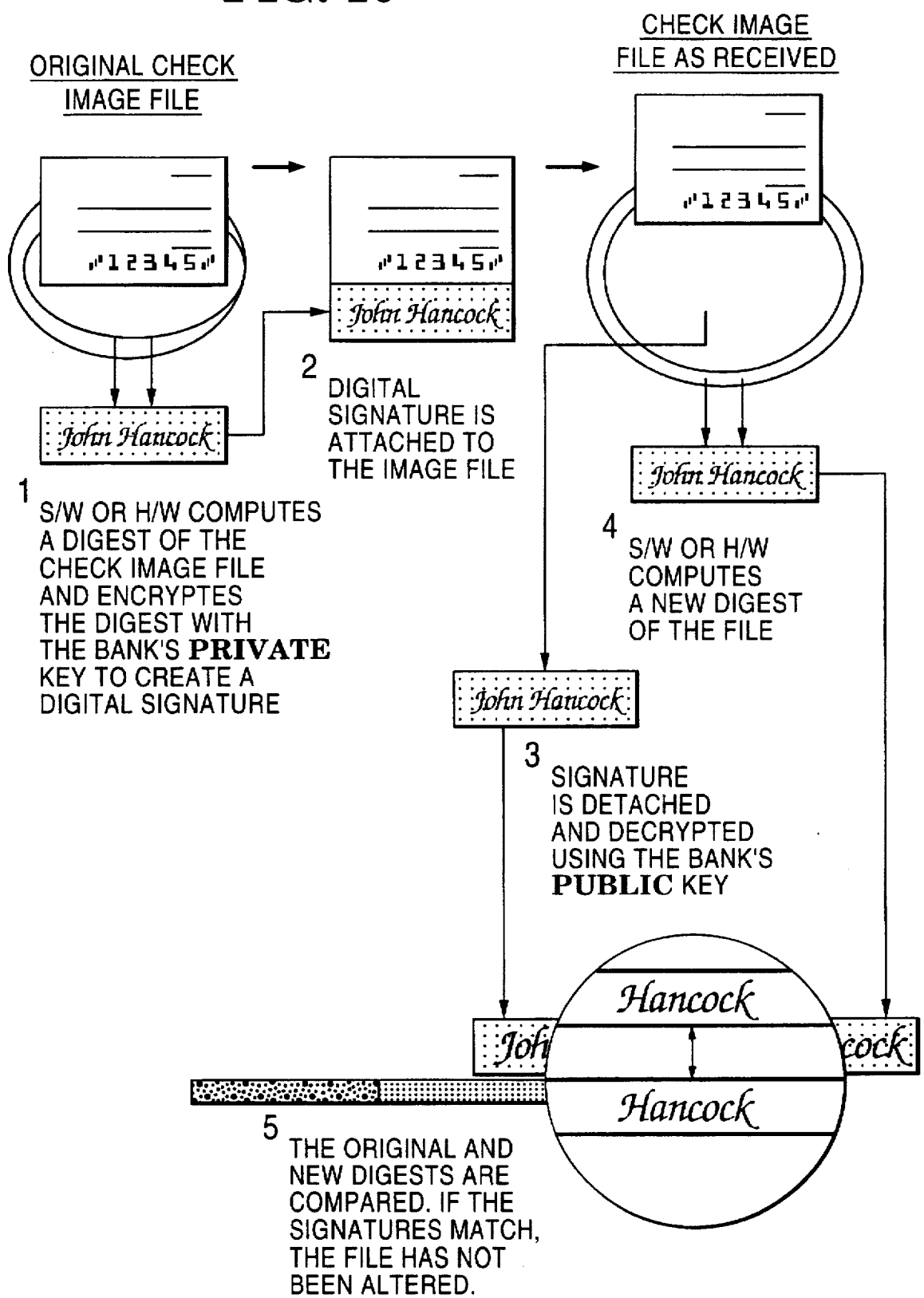
FIG. 10 illustrates an image authentication, identification and security function performed by image capture storage unit 600.

FIG. 10 illustrates an image authentication, identification and security function performed by image capture storage unit 600. The system shown is based upon a reversal of public key cryptology. A traditional system utilizes two keys, a private key with which a first user can decrypt messages which have been encrypted with the user's private key, and a public key with which other users may encrypt messages for the first user. In operation, the system shown distills the contents of a check image file into a 16-byte digital fingerprint which is then encrypted and appended to the image file. The receiving party decrypts the transmitted signature, utilizing the sender bank's public key, which is then compared to a new signature computed from the received image file. Because only the 16 bit signatures are encrypted, signing and verifying files takes only a few milliseconds and files can be processed in batches. Thus the authenticity and integrity of the transmitted documents can be reliably verified.

It can thus be seen that there has been provided by the present invention a new and useful automated document processing system which eliminates disruptions in document processing resulting from a failure in the automated processing of a document and eliminates the necessity of reprocessing documents following a failure in the automated processing of a document. These improvements are realized through the utilization of a dual path processing module which allows machine readable documents to be automatically processed, and directs illegible documents to an operator for correction and re-entry into the system.

Although the presently preferred embodiment of the invention has been described, it will be understood that various changes may be made within the scope of the appended claims.

What is claimed is:

1. A document processing system, comprising:
   an imaging unit for receiving a document, imaging the front face of said document and attempting to identify character data appearing on the face of said document, said imaging unit generating a first signal upon a failure to identify said characters;
   a character recognition unit for receiving said document from said imaging unit and reading machine-readable data printed on the face of said document, said character recognition unit generating a second signal upon a failure to read said machine-readable data; and a dual path module having a module entrance for receiving said document from said character recognition unit, a module exit, and first and second document paths for delivering said document from said module entrance to said module exit, said second document path including an action window positioned between said module entrance and said module exit which presents the document to an operator for correction prior to said document exiting said dual path module, said dual path module including means for receiving said first and second signals and for directing said document through said second path upon the receipt of said first signal, for directing said document through said second path upon the receipt of said second signal, and for directing said document through said first path otherwise.

2. The document processing system according to claim 1, further comprising:

an encoder for receiving said document from said dual path module for encoding said document with MICR character data including MICR character data corresponding to the character data identified by said imaging unit.

3. The document processing system according to claim 1, wherein:

said character data comprises character data which is hand written within predetermined areas on said document.

4. The document processing system according to claim 3, wherein:

said document is a bank check;

said character data comprises a courtesy amount; and said MICR data encoded on said document by said encoder is said courtesy amount.

5. The document processing system according to claim 1, wherein:

said character recognition unit comprises an MICR reader; and said machine-readable data comprises MICR character data.

6. The document processing system according to claim 1, wherein:

said character recognition unit comprises an OCR reader; and said machine-readable data comprises machine printed data.

7. The document processing system according to claim 1, wherein:

said character recognition unit comprises both an MICR reader and an OCR reader.

8. The document processing system according to claim 2, further comprising:

an endorse unit for receiving said document from said encoder and for printing an application specific alphanumeric string of characters on said document.

9. The document processing system according to claim 2, further comprising:

an endorse unit for receiving said document from said encoder and for printing a bar code on said document.

10. The document processing system according to claim 2, further comprising:

an image capture/storage unit for receiving said document from said encoder and providing MICR verification of data printed on said document.

11. The document processing system according to claim 2, further comprising:

an image capture/storage unit for receiving said document from said encoder and providing an image authentication and identification function for said document.

* * * * *